US006823494B2

(12) United States Patent
Minoura et al.

(10) Patent No.: US 6,823,494 B2
(45) Date of Patent: Nov. 23, 2004

(54) METHOD FOR DISPLAYING A WINDOW

(75) Inventors: Tadaaki Minoura, Sagamihara (JP); Toru Tachibana, Yokohama (JP); Yugo Tanabe, Tokyo-to (JP)

(73) Assignee: International Business Machines Corporation, Armonk, NY (US)

( * ) Notice: Subject to any disclaimer, the term of this patent is extended or adjusted under 35 U.S.C. 154(b) by 525 days.

(21) Appl. No.: 09/975,111

(22) Filed: Oct. 11, 2001

(65) Prior Publication Data

US 2002/0036661 A1 Mar. 28, 2002

Related U.S. Application Data

(62) Division of application No. 08/665,616, filed on Jun. 18, 1996.

(30) Foreign Application Priority Data

Jun. 29, 1995  (JP) .............................................. 7-163280

(51) Int. Cl.⁷ ................................................. G09G 5/00
(52) U.S. Cl. ........................ 715/800; 715/788; 715/798
(58) Field of Search ................................. 345/781, 782, 345/788, 790, 792, 794, 798, 801

(56) References Cited

U.S. PATENT DOCUMENTS 5,546,520 A   8/1996  Cline et al.

FOREIGN PATENT DOCUMENTS

| JP | 63-282523 | 11/1988 |
|----|-----------|---------|
| JP | 05-040459 | 2/1993  |
| JP | 05-282119 | 10/1993 |

OTHER PUBLICATIONS

U.S. patent application Ser. No. 08/665,616, Minoura et al., filed Jun. 18, 1996.

Brad A. Myers, "A Taxonomy of Window Manager User Interfaces," IEEE, Sep. 1998, pp. 65–84.

Robert Cowart, "Mastering Windows 3.1," 1993, pp. 151–157.

*Primary Examiner*—Ba Huynh
(74) *Attorney, Agent, or Firm*—A. Bruce Clay; Dillon & Yudell LLP

(57) ABSTRACT

A window display enables a user to easily identify a window to which a selected object belongs. A computer system displays a plurality of windows, each of which includes one or a plurality of objects, and which displays a window to which a selected object belongs. The window field to which a selected object belongs is, in response to the selection of the object, displayed with an attribute, e.g., with a domain (background) color, that differs from that of other window fields. In this manner, it is possible for a user to easily identify the window of the selected object.

4 Claims, 7 Drawing Sheets

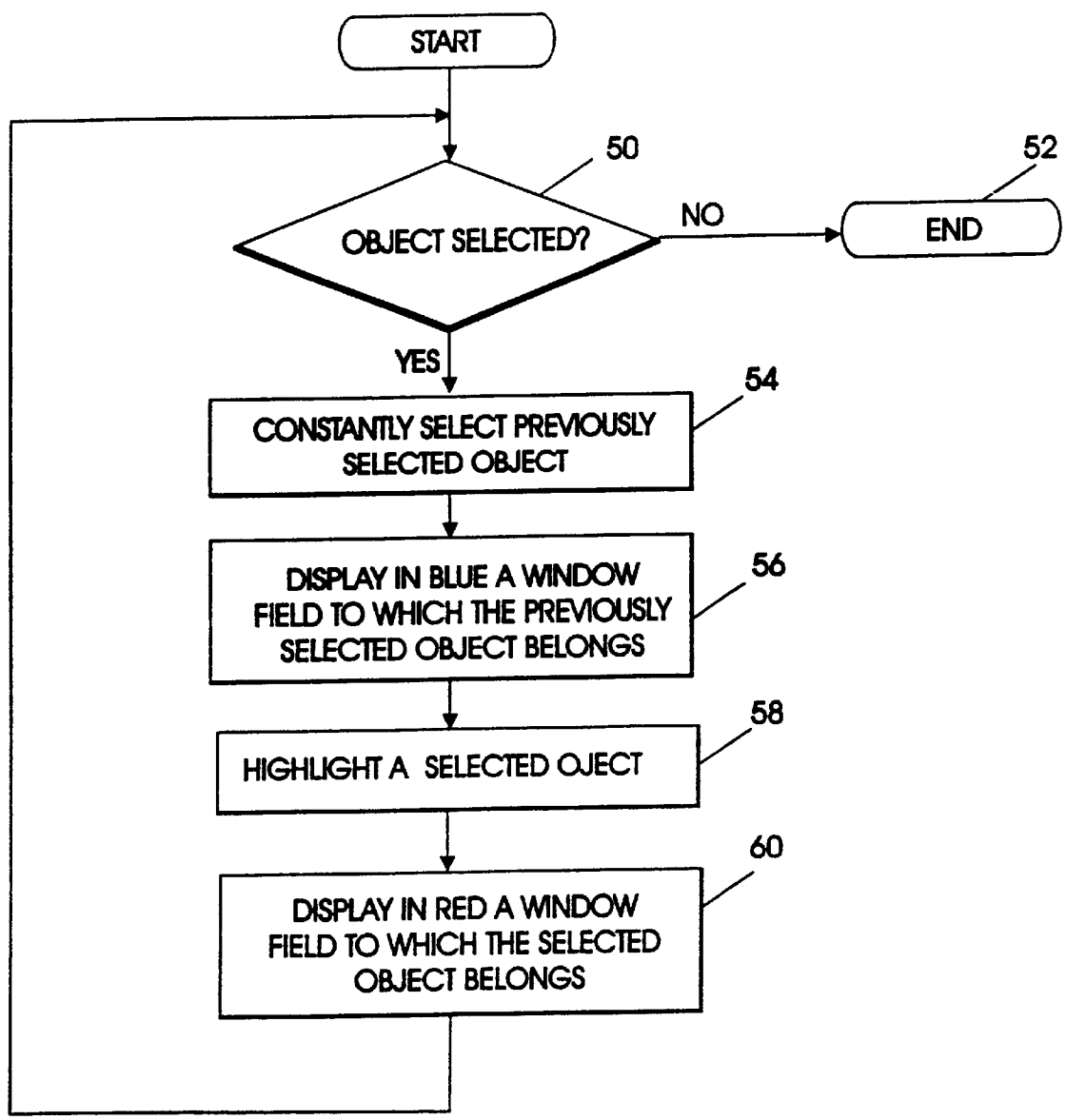

METHOD FOR DISPLAYING A WINDOW

This is a Continuation, or Division of application Ser. No. 08/665,616, filed Jun. 18, 1996, currently pending.

FIELD OF THE INVENTION

The present invention relates to a method for displaying a window on a display device, and in particular to a method for displaying a window on a display device that is employed with a notebook-sized or smaller computer.

DESCRIPTION OF THE BACKGROUND

The following methods are well known for the display of all the objects (items, icons, etc.) that are included in a window. One method involves the arranging of objects in fixed fields or domains that are provided in advance and to which objects are assigned. With this display method, however, borderlines are required to delimit the fields or domains. And these borderlines tend to render a screen complicated. In addition, the arrangement of the fields must be optimized in consonance with the addition and the deletion of objects, or there will be unoccupied domains on a screen. Another method involves the entering of a plurality of objects that belong to a single group (category) into each window, or each folder, that is provided to represent a group. This conventional method also requires delimited areas, such as window fields. Since a display device, such as a palmtop computer, has too small a display area in which to represent a plurality of windows at the same time, the windows must be so displayed that they overlap each other, and thus it is difficult to display all the objects on a screen and to select a desired object.

FIGS. 3 and 4 are diagrams that show examples of conventional techniques. In the category display example that is shown in FIG. 3, an arrangement is depicted that is used for the display of a menu on a palmtop computer. With this method, while all the objects are displayed, borderlines must be displayed that designate the boundaries of fixed group domains. Even if an object is deleted, the boundary of the domain to which the object belonged is not altered, and within it there is an empty, unused area. FIG. 4 is a diagram showing a window display example for which a common window is employed. This example also requires borderlines, such as those that are represented by window fields, title areas, and scroll bars. Since a display device, such as a palmtop computer, has a small display area, all of the contents of a plurality of group windows can not be displayed at the same time. The windows must overlap each other when they are displayed, and not all the objects in the second group window, which is partially hidden under the first group window, can be seen. In other words, since all the objects cannot be displayed on the screen simultaneously, an extra operation must be performed before a desired object can be selected.

It is therefore one object of the present invention to provide a method, for the display of a window, by which it is possible for a user, even when a display area is small, to easily identify to which window an object that the user has selected from among a plurality objects belongs.

SUMMARY OF THE PRESENT INVENTION

To achieve the above object, according to the present invention, first, a plurality of objects are displayed in a display area, and a first attribute (e.g., a display color or a luminance level) is employed for the display of the physically borderless window (category) fields (which constitute backgrounds for the objects) to which the objects belong. Then, when a user selects a specific object from among the objects in the display area, in response to the selection of the specific object, a second attribute is employed for the display of the object's window field (the background for the object). As a result, the window to which the object belongs can be easily recognized.

BRIEF DESCRIPTION OF THE DRAWINGS

For a more complete understanding of the present invention and for further advantages thereof, reference is now made to the following Detailed Description taken in conjunction with the accompanying drawings, in which:

FIG. 7 is a flowchart for the display of windows according to the embodiment of the present invention.

DESCRIPTION OF THE PREFERRED EMBODIMENT

Figure 1:
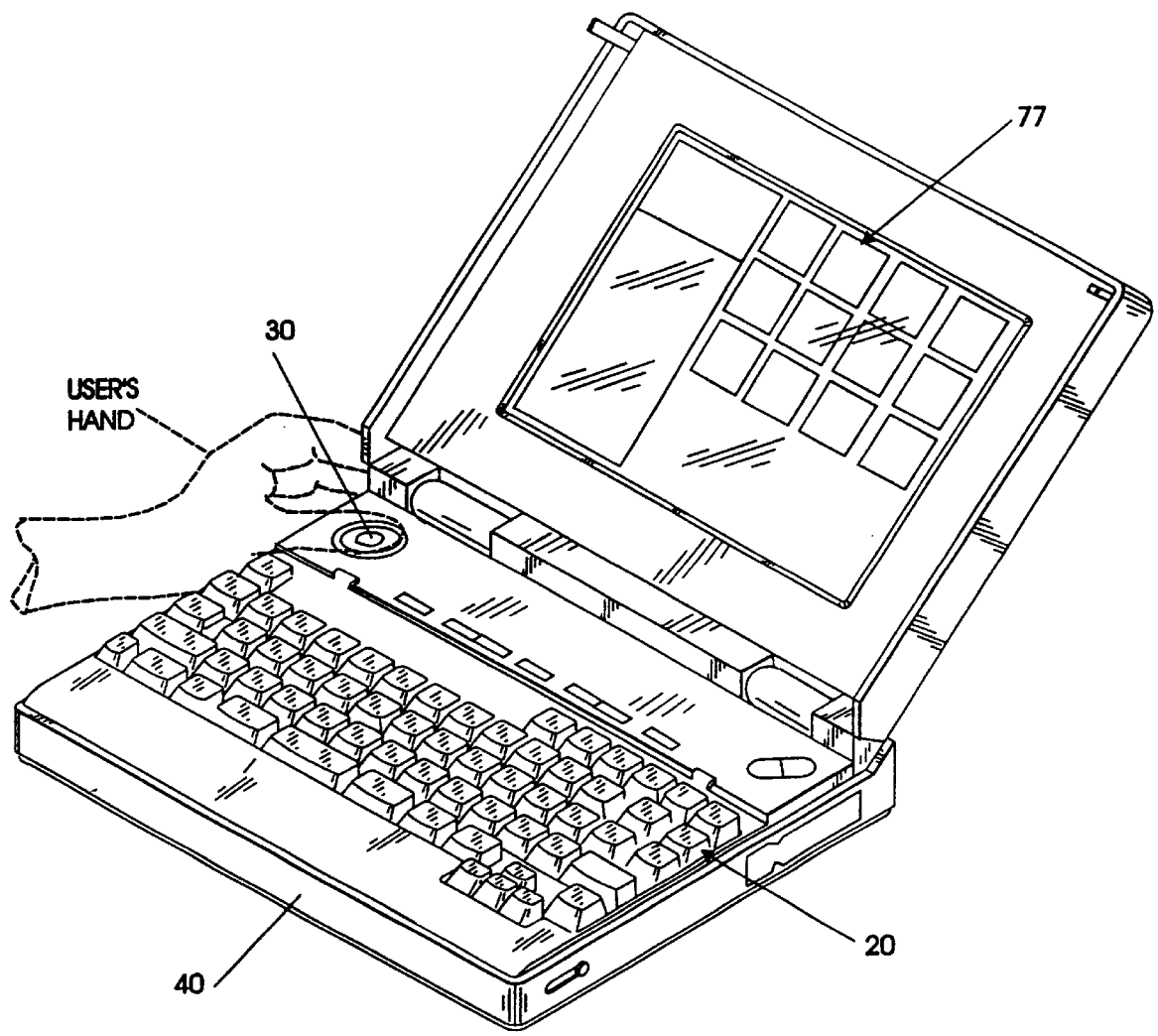
FIG. 1 is a diagram illustrating the external appearance of specific hardware that can carry out the present invention.
Figure 2:
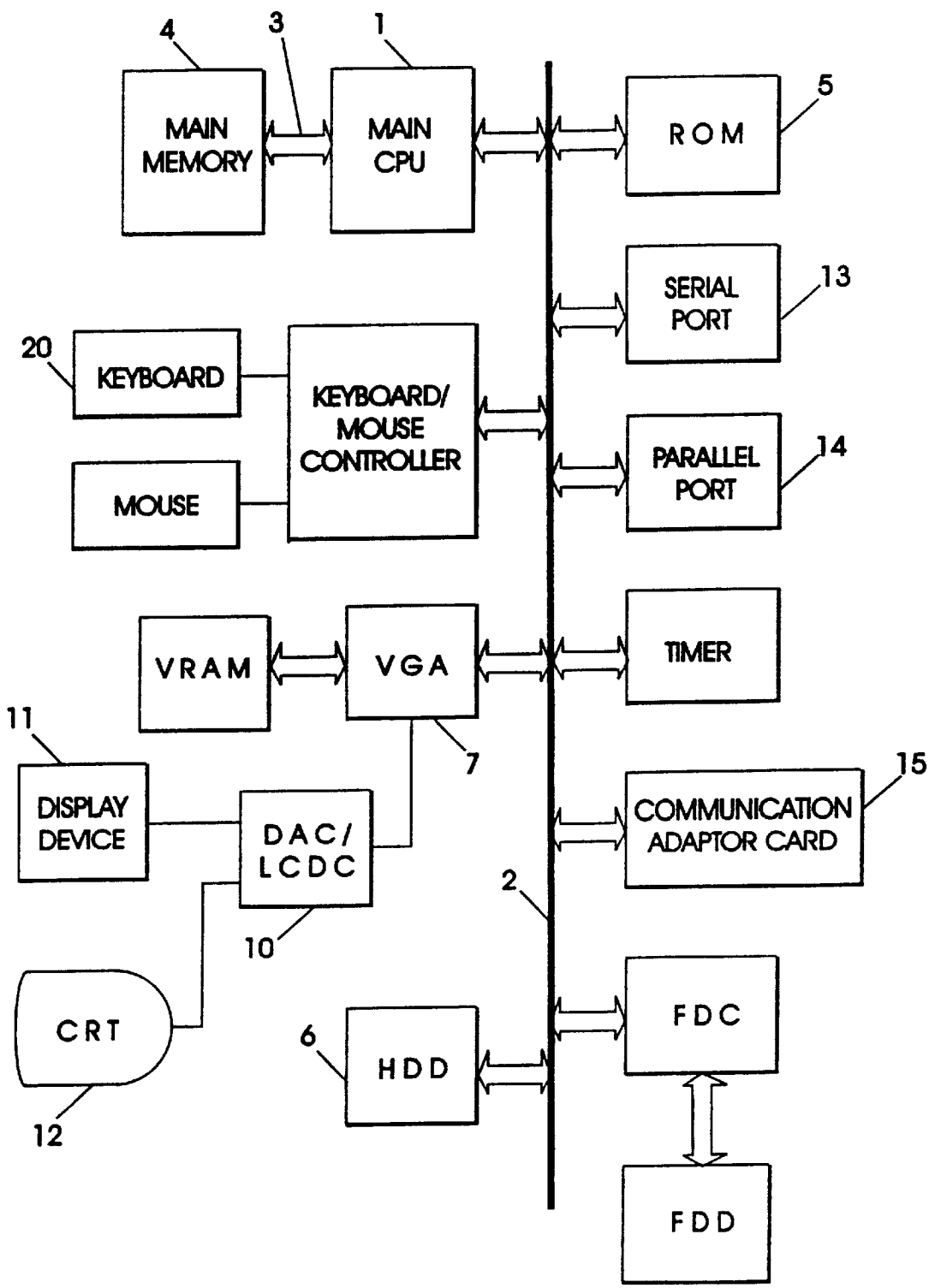
FIG. 2 is a diagram illustrating a specific hardware arrangement for carrying out the present invention.
Figure 3:
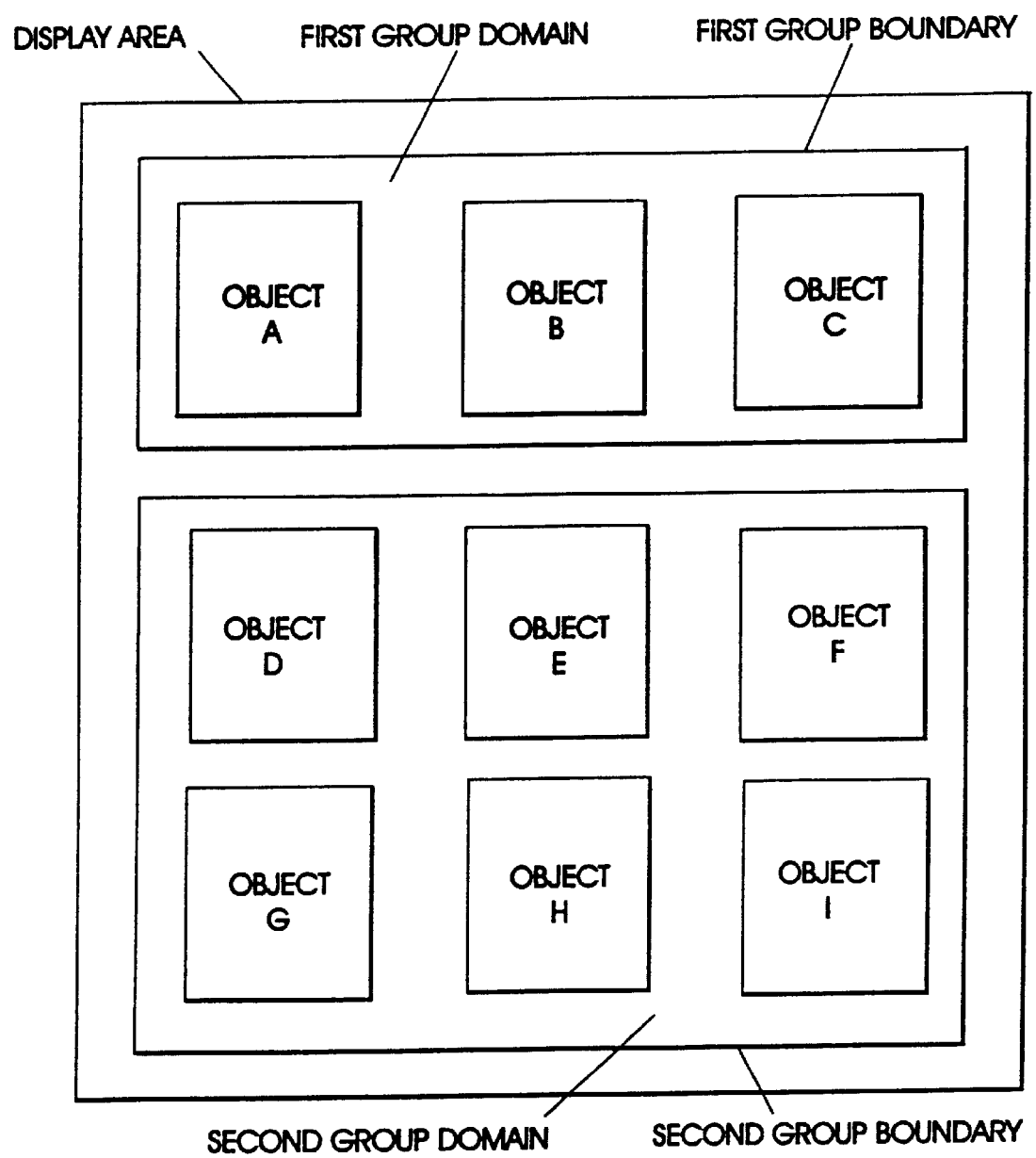
FIG. 3 is a diagram showing a conventional window display example in accordance with the prior art.
Figure 4:
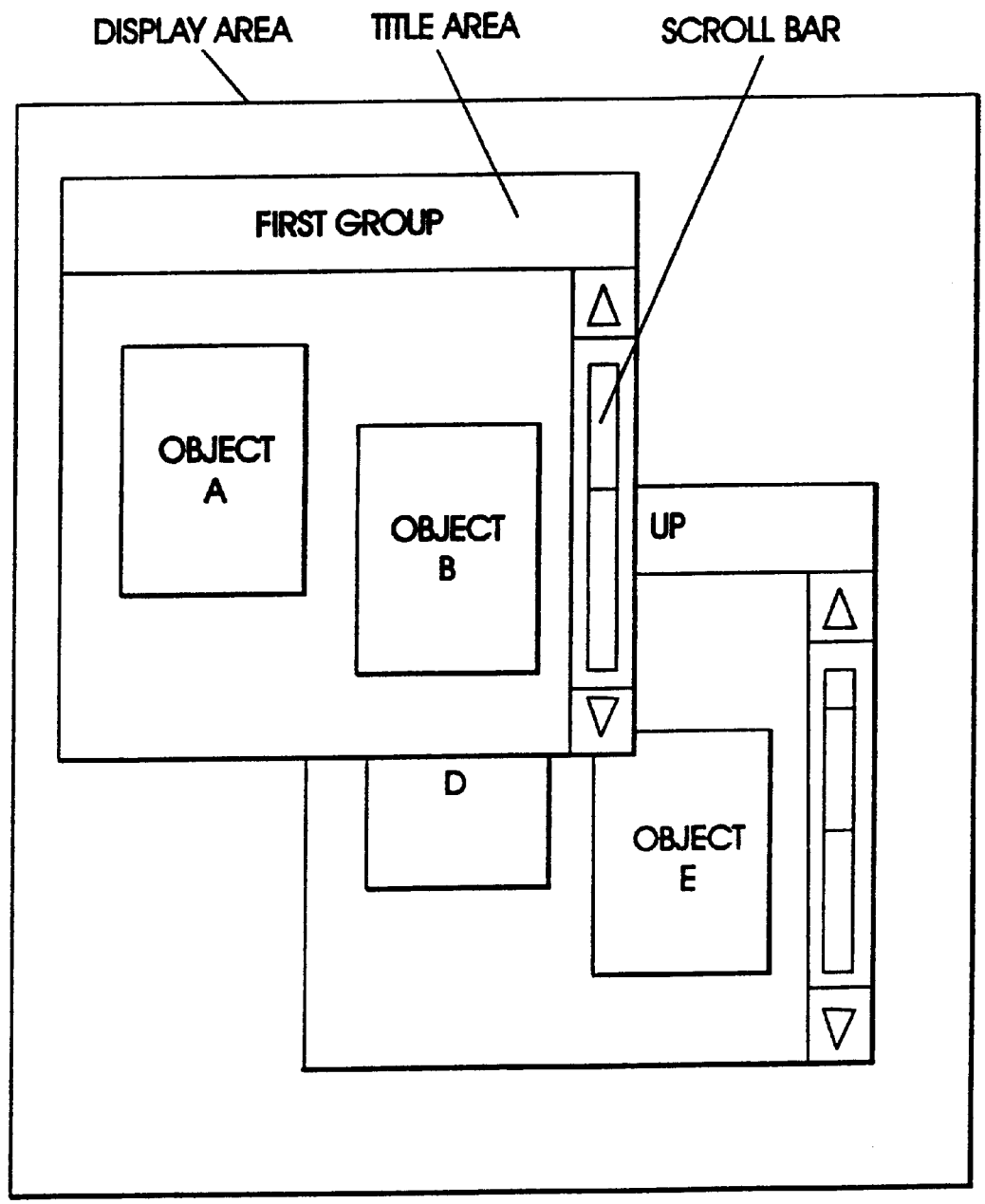
FIG. 4 is a diagram showing another conventional window display example in accordance with the prior art.

FIGS. 1 and 2 are specific hardware environments for carrying out the present invention. The present invention is especially effective for small computers, such as notebook computers or palmtop computers, that have a small display area; however, the present invention can also be applied for common hardware environments, e.g., personal computers, such as the PS/2 personal computers that are made by International Business Machine (IBM) Corporation (PS/2 is a trademark of IBM Corp.). In FIG. 1, a palmtop personal computer 40 has a liquid crystal display device 11. A menu that includes a plurality of objects is displayed on the liquid crystal display device 11, and a user selects one of the objects by using a keyboard 20 or a pointing device 30.

In FIG. 2, a main CPU 1 can be either a microprocessor, such as an Intel 386, 486 or a Pentium microprocessor, that serves as a complex instruction set computer (CISC), or a micro processor, such as a Power PC microprocessor from IBM, that serves as a reduced instruction set computer (RISC). The main CPU 1 communicates with a system bus 2 to which is connected a main memory (RAM) 4, a read only memory (ROM) 5, and various input/output (I/O) adapters. The main memory 4 is employed to temporarily store code for an application program, and data, and the ROM 5 is employed to store basic input/output system (BIOS) code. A disk drive (HDD) 6 is used to store an operating system, and application programs that concern various objects that are selectively loaded into the RAM 4 via the system bus 2. A display adaptor controller (DAC/LCDC) 10, to which is connected a video graphics array (VGA) 7, communicates with a liquid crystal display device 11 or with an external CRT display 12.

Figure 5:
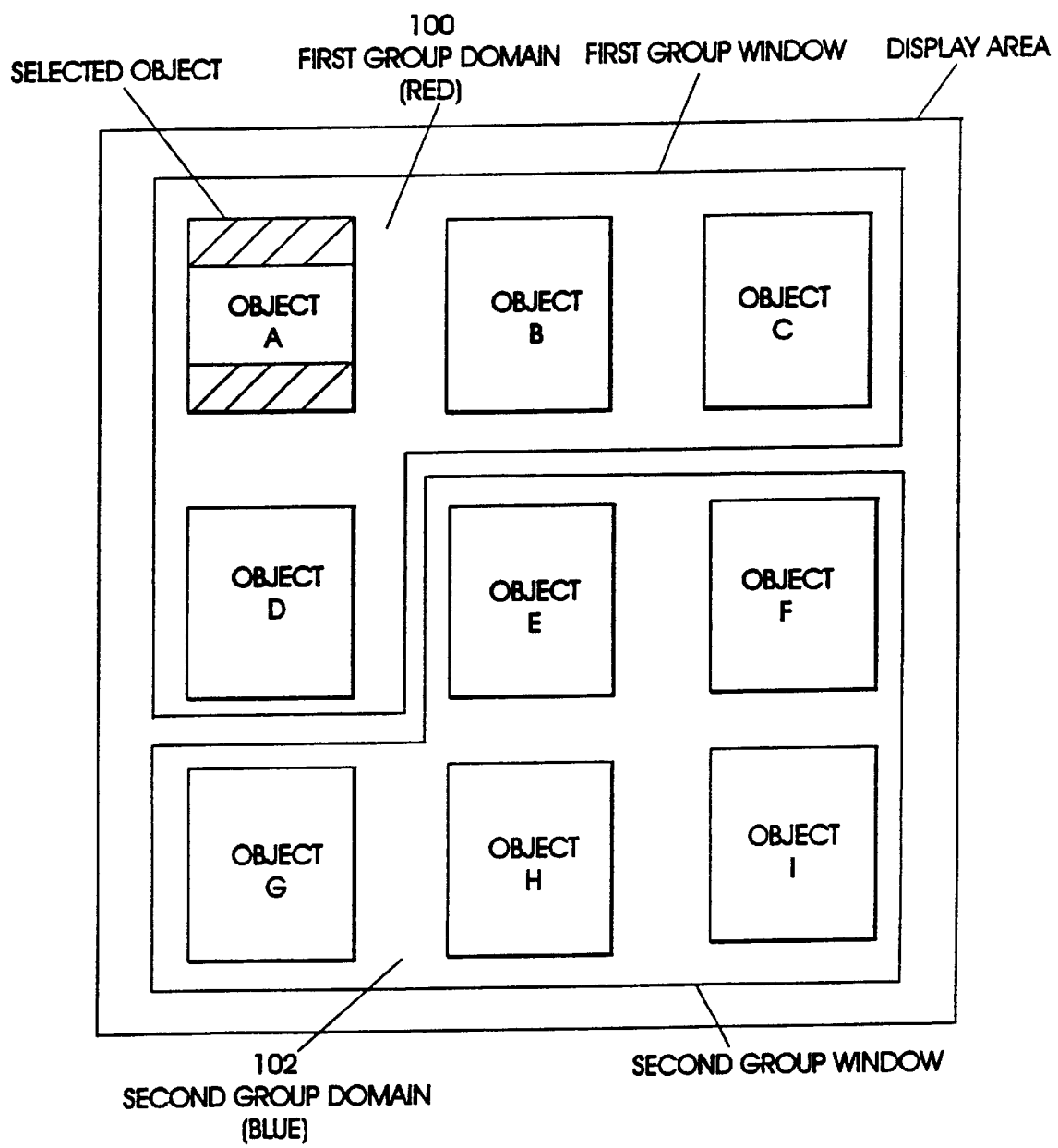
FIG. 5 is a diagram showing a screen on which windows are displayed according to one embodiment of the present invention.

FIG. 5 is a diagram showing a window display screen according to the present invention. As is frequently performed by a common palmtop computer, borderless windows are displayed with no overlapping as a menu in which all the objects are systematically arranged. A selected object is displayed with an outward appearance that differs from that of the other objects (in this embodiment, it is highlighted to distinguish it from the other objects) so that it can be identified easily. It should be noted that there is no cursor in this embodiment.

More specifically, in this embodiment, to enable easy object selection, at the time a computer is activated the selection of a predetermined object has already occurred. Then, another object is selected when a cursor key (a direction key) on a keyboard is depressed. In this embodiment, therefore, the moving of the cursor key corresponds to the changing of the selected object. Upon the depression of a return key on the keyboard, or of the selection button of a pointing device, a function (application program) that is correlated with the object that is selected is finally executed.

Figure 6:
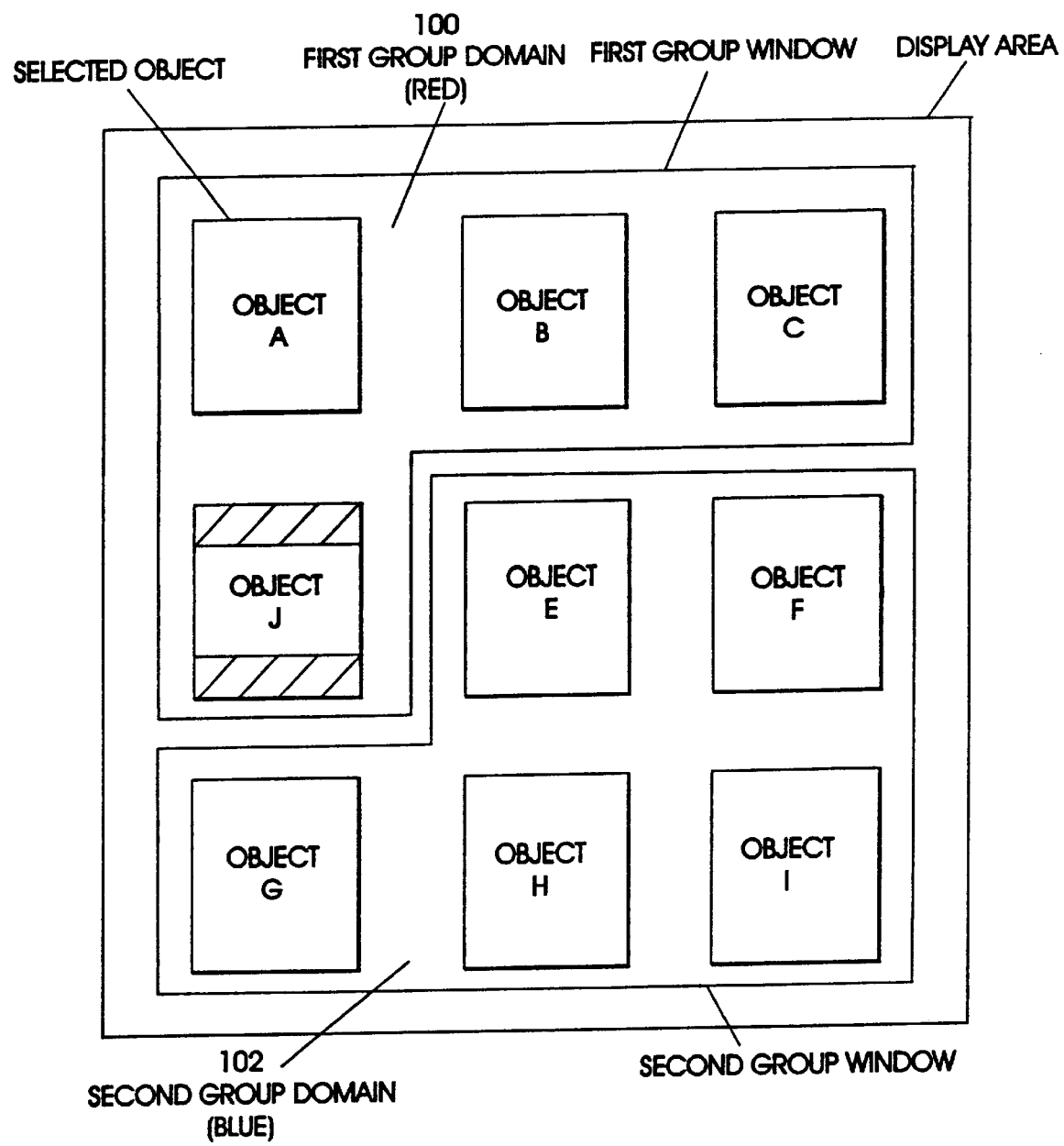
FIG. 6 is a diagram showing another screen on which windows are displayed according to the embodiment of the present invention.

In FIG. 5, since object A is selected, that object is highlighted to distinguish it from the other objects. The first group domain (the background for the objects) of the first group window, to which object A belongs, is displayed in red, as generally indicated by reference numeral 100, which is the second display attribute. On the other hand, the second group domain of the second group window, in which object A is not included, is displayed in blue, as generally indicated by reference numeral 102, which is the first display attribute. Obviously, since colors are not shown on the Figures, it is to be understood that the red and blue would show on a color display of a computer. When the cursor key on the keyboard is employed to change the selected object from object A to object D, which is positioned below object A, the color of the background is not changed because the first group window, to which object D belongs, is the same window to which object A belongs. However, when the cursor key is depressed once more, the selected object is changed from object D to object G. When object G is highlighted, the second group domain 102 (which includes the selected object G) is changed from blue to red, which is the second attribute, and the color of the first group domain 100 is changed from red to blue, which is the first attribute. In this manner, a user is able to easily and quickly identify the window to which a selected object belongs. In FIG. 5, when object D is deleted, the first group domain 100 is dynamically altered and a new first group domain is prepared that consists of objects A, B and C, and that has no extra space. When a new object J is created and inserted into the first group, the first group domain 100 is dynamically changed, and a new first group window that includes objects A, B, C and J is displayed, as is shown in FIG. 6.

FIG. 7 is a flowchart for selecting and displaying an object according to the present invention. At step 50, a check is performed to determine whether or not a new object has been selected. When an object has not been selected, processing is terminated. When an object has been selected, program control advances to step 54. At step 54, the display state of an object that was previously selected is changed to a normal display state. At step 56, the group domain of a window to which the previously selected object belongs is displayed in blue, which is the first attribute. At step 58, the newly selected object is highlighted, and at step 60 the group domain of the window to which the selected object belongs is displayed in red, which is the second attribute. Thereafter, program control returns to step 50.

Although a cursor pointer, or such, which is a substantial figure, is not employed to perform easy object selection, a pointer, for a pointing device such as a mouse, that can be freely moved within a display area can be employed to perform the operation of the present invention without causing the essential nature of the present invention to be lost. A variation in luminance may be employed as a display attribute.

According to the present invention, when selecting an object from among a plurality of objects on a screen, a user can immediately identify the window to which the selected object belongs, so that the selection of an object with high usability can be facilitated.

Although the present invention has been described with respect to a specific preferred embodiment thereof, various changes and modifications may be suggested to one skilled in the art, and it is intended that the present invention encompass such changes and modifications as fall within the scope of the appended claims.

What is claimed is:

1. A method for displaying objects within a computer system, said method comprising the steps of:

displaying a plurality of windows within said computer system;

identifying a first group of related objects within a first window which encompasses said first group of related objects;

selecting a particular one of said first group of related objects;

deleting said particular one of said first group of related objects; and automatically altering said first window to encompass only said remaining related objects within said first group without extra space therein in response to said deletion.

2. The method of displaying objects within a computer system according to claim 1, further including the steps of:

adding a new object to said first group of related objects; and automatically altering said first window to encompass said new object and said first group of related objects in response to said addition.

3. A system for displaying objects within a computer system, said system comprising:

means for displaying a plurality of windows within said computer system;

means for identifying a first group of related objects within a first window which encompasses said first group of related objects;

means for selecting a particular one of said first group of related objects;

means for deleting said particular one of said first group of related objects; and means for automatically altering said first window to encompass only said remaining related objects within said first group without extra space therein in response to said deletion.

4. The system for displaying objects within the computer system according to claim 3, further including:

means for adding a new object to said first group of related objects; and means for automatically altering said first window to encompass said new object and said first group of related objects in response to said addition.

* * * * *